US011213869B2

(12) United States Patent
Piascik et al.

(10) Patent No.: US 11,213,869 B2
(45) Date of Patent: Jan. 4, 2022

(54) SOLID WASTE TREATMENT SYSTEM

(71) Applicant: Research Triangle Institute, Research Triangle Park, NC (US)

(72) Inventors: Jeffrey Robert Piascik, Raleigh, NC (US); Charles David Stokes, Cary, NC (US); Ethan Klem, Durham, NC (US); Brian Rhys Stoner, Chapel Hill, NC (US); Christopher Gregory, Chapel Hill, NC (US); Nicholas G. Baldasaro, Cary, NC (US); Katelyn Lea Sellgren, Cary, NC (US); David E. Rogers, Durham, NC (US); Brian Grant, Raleigh, NC (US); Brian Thomas Hawkins, Durham, NC (US); Enzo Cellini, Chapel Hill, NC (US)

(73) Assignee: Research Triangle Institute, Research Triangle Park, NC (US)

( * ) Notice: Subject to any disclaimer, the term of this patent is extended or adjusted under 35 U.S.C. 154(b) by 479 days.

(21) Appl. No.: 16/267,553

(22) Filed: Feb. 5, 2019

(65) Prior Publication Data

US 2019/0169058 A1 Jun. 6, 2019

Related U.S. Application Data (63) Continuation of application No. PCT/US2017/044694, filed on Jul. 31, 2017.
(Continued)

(51) Int. Cl.
*C02F 11/13* (2019.01)
*C02F 11/12* (2019.01)
(Continued)

(52) U.S. Cl.
CPC .............. *B09B 3/0083* (2013.01); *C02F 9/00* (2013.01); *C02F 11/12* (2013.01); *C02F 11/13* (2019.01)

(58) Field of Classification Search
CPC .......... B09B 3/0083; C02F 9/00; C02F 11/12; C02F 11/13; Y02W 10/37
See application file for complete search history.

(56) References Cited

U.S. PATENT DOCUMENTS

| 3,899,405 A | 8/1975 | Iverson et al. |
| 4,024,055 A | 5/1977 | Blann |

(Continued)

FOREIGN PATENT DOCUMENTS

| KR | 10-2002-0071143 A | 9/2002 |
| KR | 10-2015-0105299 A | 9/2015 |
| WO | 2018026747 A1 | 2/2018 |

OTHER PUBLICATIONS

WIPO, International Preliminary Report on Patentability for International Application No. PCT/US17/44694, dated Feb. 12, 2019, 10 pages.
(Continued)

*Primary Examiner* — Patrick Orme
(74) *Attorney, Agent, or Firm* — NK Patent Law (57) ABSTRACT

A solid waste treatment system includes: a solid-liquid separator module configured to receive mixed solid and liquid waste and separating solid material from the mixed solid and liquid waste; an accumulator and macerator module configured to receive and macerate the solid material from the solid-liquid separator module; a drying module configured to receive and dry the macerated solid material from the accumulator and macerator module; and a combustion module configured to receive and combust the dried macerated solid material from the drying module.

17 Claims, 5 Drawing Sheets

Related U.S. Application Data (60) Provisional application No. 62/372,211, filed on Aug. 8, 2016.

(51) Int. Cl.
  *B09B 3/00* (2006.01)
  *C02F 9/00* (2006.01)

(56) References Cited

U.S. PATENT DOCUMENTS

| | | | |
|---|---|---|---|
| 4,133,273 A * | 1/1979 | Glennon | C02F 11/12 110/221 |
| 5,244,308 A | 9/1993 | Mims | |
| 5,389,114 A * | 2/1995 | Forder | C02F 11/12 210/748.07 |
| 8,734,751 B2 | 5/2014 | Iang | |
| 2007/0051640 A1 | 3/2007 | Bellamy | |
| 2007/0173679 A1 | 7/2007 | Guyomarc'h | |
| 2009/0145344 A1 | 6/2009 | Dam-Johansen et al. | |
| 2009/0223882 A1 | 9/2009 | Markle et al. | |
| 2012/0152835 A1 | 6/2012 | Cardenas et al. | |
| 2013/0299426 A1 | 11/2013 | McLeod | |
| 2014/0309475 A1 | 10/2014 | Van Naarden et al. | |
| 2015/0135785 A1 | 5/2015 | Wang et al. | |
| 2015/0368137 A1 | 12/2015 | Miller et al. | |
| 2016/0355419 A1 * | 12/2016 | Chauvin | C02F 1/4674 |
| 2017/0029295 A1 | 2/2017 | Ritchie et al. | |

OTHER PUBLICATIONS

USPTO, non-Final Office Action in U.S. Appl. No. 16/267,420 dated May 14, 2020.

ISA/KR; International Search Report and Written Opinion for International Application No. PCT/US17/44694 dated Jan. 29, 2018, 13 pages.

ISA/KR; International Search Report and Written Opinion for International Application No. PCT/US17/44786 dated Nov. 9, 2017, 12 pages.

* cited by examiner

SOLID WASTE TREATMENT SYSTEM

CROSS-REFERENCE TO RELATED APPLICATION

This application is a continuation of PCT patent application no. PCT/US2017/044694 titled "SOLID WASTE TREATMENT SYSTEM", filed on Jul. 31, 2017, which claims the benefit of priority of U.S. provisional patent application No. 62/372,211 titled "Solid Waste Treatment System," filed on Aug. 8, 2016, all of which are incorporated herein in their entirety by this reference.

TECHNICAL FIELD

The present disclosure relates to solid waste treatment. More particularly, the present disclosure relates to a modular solid waste treatment system that operates independently from other infrastructure.

BACKGROUND

Current facilities for disposal of solid human waste include large-scale sewage systems as found in cities and large installations, and portable relief units temporarily deployed to construction sites and other locations where people gather. The large-scale sewage systems are typically years in the making and are integrated into the landscape having buried pipes and permanent treatment facilities. The large scale systems also require water distribution systems for the flushing of toilets and for the carrying of toilet effluent long distances along sewage canals or conduits. Even where toilet effluent is locally deposited without travel to a sewage treatment facility, as in rural areas where buried septic tanks and field lines are installed, a water distribution for flushing is still required, and the local impact on nearby ground, although buried, is a long term consideration.

While portable units such as porta-potties can be deployed relatively quickly, their maintenance and cleaning is required quite often, sometimes daily or at least weekly in many circumstances. Also, while these units typically have odor-abating chemicals in their storage tanks, their use ultimately requires delivery of their sewage contents to a large-scale sewage system or treatment facility. Thus, these typical units are reliant upon greater existing infrastructure.

Deployable stand-alone solid waste treatment systems and methods are needed that are independent of other infrastructure.

SUMMARY

This summary is provided to introduce in a simplified form concepts that are further described in the following detailed descriptions. This summary is not intended to identify key features or essential features of the claimed subject matter, nor is it to be construed as limiting the scope of the claimed subject matter.

In at least one embodiment, a solid waste treatment system includes: a solid-liquid separator module configured to receive mixed solid and liquid waste and separate solid material from the mixed solid and liquid waste; an accumulator and macerator module configured to receive and macerate the solid material from the solid-liquid separator module; a drying module configured to receive and dry the macerated solid material from the accumulator and macerator module; and a combustion module configured to receive and combust the dried macerated solid material from the drying module.

The solid-liquid separator module may include a conveyor having spaced belts through which liquid can drain from mixed solid and liquid waste. The conveyor can transport solid material to the accumulator and macerator module.

The accumulator and macerator module may include an accumulator for receiving the solid material from the solid-liquid separator module and a first actuator configured to force solid material from the accumulator.

The accumulator and macerator module may include a macerator into which the first actuator is configured to force solid material.

The solid waste treatment system may include an extrusion module through which the drying module can receive macerated solid material from the accumulator and macerator module.

A first actuator may be configured to force solid material into the macerator, thereby forcing macerated solid material into the extrusion module.

The extrusion module may include a valve through which the extrusion module can receive macerated solid material from the accumulator and macerator module.

The extrusion module may include: a loading tube configured to receive macerated solid material from the accumulator and macerator module through the valve; a second actuator configured to force macerated solid material through the valve and to the drying module.

In at least one example, the valve is configured in a first position when the loading tube is to receive macerated solid material from the accumulator and macerator module through the valve; and the valve is configured in a second position when the second actuator is to force macerated solid material through the valve and to the drying module.

The drying module may include a drying plate configured to rotate when the drying module receives the macerated solid material from the extrusion module and to dry the macerated solid material. The drying module may include a scraper configured to remove the dried macerated solid material from the drying plate.

The combustion module may include: a combustor; and a hopper configured to transport dried macerated solid material from the drying module to the combustor. The hopper may include a travel conduit in which a rotating auger transports the dried macerated solid material to the combustor.

The combustion module may produce a flue gas upon combusting dried macerated solid material and provide the flue gas to the drying module. A thermo-electric power generation device may be placed in the flue gas to receive thermal energy and generate electrical power.

In at least one embodiment, a method of solid waste treatment includes: receiving, by a solid-liquid separator module, mixed solid and liquid waste; separating, by the solid-liquid separator module, solid material from the mixed solid and liquid waste; macerating, by an accumulator and macerator module, the solid material; drying, by a drying module, the macerated solid material; combusting, by a combustion module, the dried macerated solid material;

The combustion module may produce a hot flue gas and provide the hot flue gas to the drying module.

The macerated solid material may be extruded onto a rotating drying plate of the drying module.

In at least one example, the solid material is forced into a macerator of the accumulator and macerator module.

Forcing the solid material into a macerator of the accumulator and macerator module may cause the macerated solid material to be force into an extrusion module.

The extrusion module may include: a valve; a loading tube that receives the macerated solid material from the accumulator and macerator module through the valve; and a second actuator that forces the macerated solid material through the valve and into the drying module. The valve can be in a first position when the loading tube receives the macerated solid material from the accumulator and macerator module through the valve; and the valve can be in a second position when the second actuator forces the macerated solid material through the valve and to the drying module.

The valve can be switched from the first position to the second position after the loading tube receives the macerated solid material and before the second actuator forces the macerated solid material through the valve and to the drying module.

BRIEF DESCRIPTION OF THE DRAWINGS

The previous summary and the following detailed descriptions are to be read in view of the drawings, which illustrate particular exemplary embodiments and features as briefly described below. The summary and detailed descriptions, however, are not limited to only those embodiments and features explicitly illustrated.

DETAILED DESCRIPTIONS

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although the term "step" may be expressly used or implied relating to features of processes or methods, no implication is made of any particular order or sequence among such expressed or implied steps unless an order or sequence is explicitly stated.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

Figure 1:
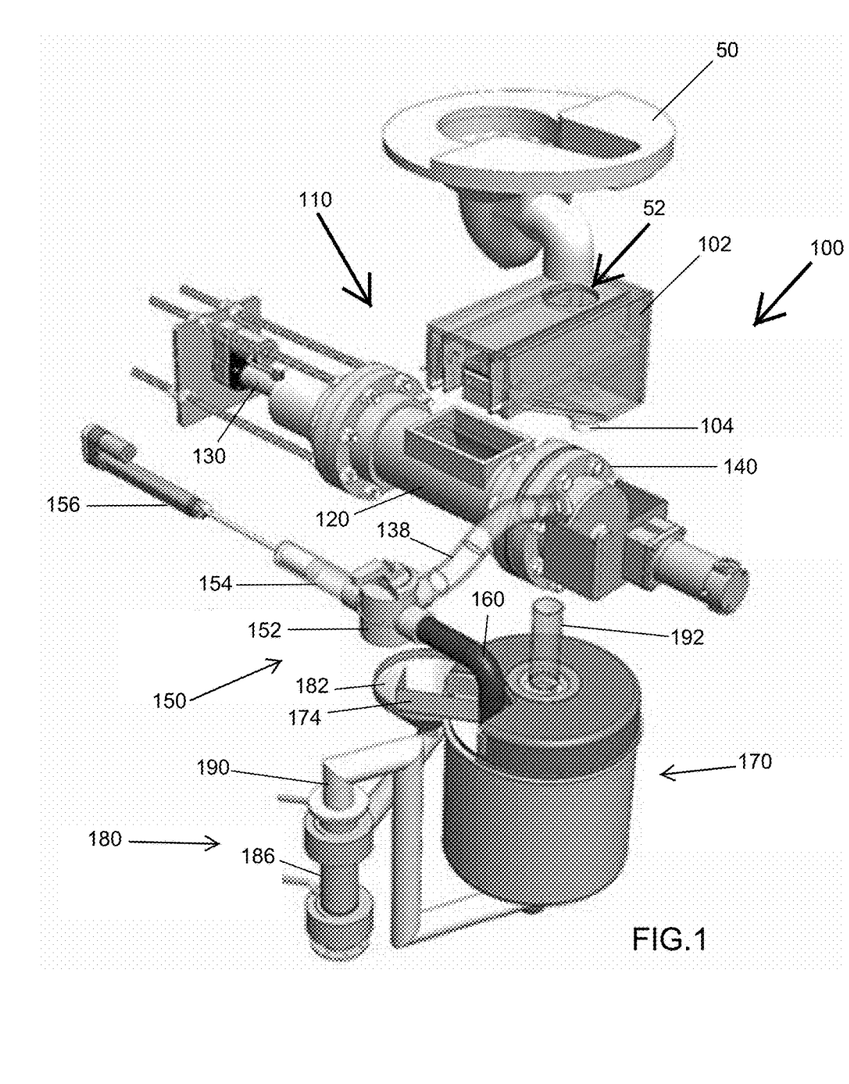
FIG. 1 is a perspective view of a solid waste treatment system according to at least one embodiment.

In at least one embodiment, a solid waste treatment system 100 (FIGS. 1-3) receives mixed effluent downstream of a toilet, commode, or other latrine fixture. The effluent is expected to contain urine, feces, toilet paper where such is used, flush and rinse water, and other substances typical in toilet discharges. The solid waste treatment system 100 is modular, having subsystems arranged to effect an ordered waste treatment. The subsystems are described in the following as modules in an order according to their treatment function.

Although the expressly illustrated toilet 50 (FIGS. 1-2) is shown as a squat toilet with an S-trap vapor lock, other types of toilets are within the scope of these descriptions. The effluent 52 from the toilet 50 will generally include both liquid and solid wastes. Processing of the effluent 52 by the system 100 begins at the solid-liquid separator module 102, which receives the mixed effluent 52 after flushing of the toilet 50, captures any solid material in the mixed effluent, and allows the liquid to drain via an exit port 104 (FIG.). The liquid may be routed to and treated by a liquid waste treatment system, for example as reached by a drainage conduit 108 (FIG. 3) from the exit port.

The solids are captured on a motorized conveyor 106 (FIG. 3) having tightly spaced belts, which may include or be constructed of polypropylene, mounted on rollers while the liquid drains toward the lower exit port 104. The conveyor may be actuated after a predetermined amount of time following each flush, for example ten seconds, to allow for most of the liquid to drain. For example, an integrated PLC may monitor flushing and control the timed actuations of the conveyor. A DC motor may power the conveyor.

The conveyor 106 (FIG. 3) of the solid-liquid separator 102 delivers the solids collected from the effluent 52 of the toilet 50 (FIGS. 1-2) to an accumulator and macerator module 110 for processing. The accumulator and macerator module 110 has an accumulator 120, an actuator 130, and a macerator 140. Solids delivered from solid-liquid separator 102 drop into an upper opening of the accumulator 120 and are collected there until the actuator 130 activates, pressing or forcing the contents of the accumulator 120 into rotating blades housed in the macerator 140. The macerator 130 mixes the solids into a more homogenous form of relatively greater uniformity in consistency than as delivered by the solid-liquid separator 102.

In the illustrated example, the accumulator 120 has an outer pipe housing with a tubular interior, and the actuator 130 is a linear actuator that drives a solid-core cylinder along the tubular interior. The accumulator and macerator module 110, for example, may be activated once solids are accumulated in a metered amount so as to deliver consistent loads to the macerator 130. In the illustrated example in which the actuator 130 is a linear actuator, the duty cycle of the accumulator and macerator module 110 includes a single stroke of the actuator 130. Other actuator types are within the scope of these descriptions. For example, rotary, pump, or other actuators in other embodiments can be activated for a metered time in a duty cycle of the accumulator and macerator module 110.

The actuator 130 and macerator blades are activated at the same time so as to drive the output of the macerator 130 into a conduit that leads to an extrusion module 150. The extrusion module 150 (FIG. 1) includes a three-way valve 152, a loading tube 154, an actuator 156, and a dispensation nozzle 160. A first position of the three-way valve 152 is coordinated with the activation of the accumulator and macerator module 110 such that the valve 152 defines a route from the conduit 140 to the loading tube 154 as the actuator 130 drives material into and through the macerator 140. Thus the loading tube 154 is loaded as the accumulator and macerator module 110 is activated. In that first position of the valve 152, the dispensation nozzle 160 is functionally isolated to prevent unmetered forward dispensation toward downstream modules as the loading tube 154 is loaded.

When the loading tube 154 is loaded, the valve 152 can be switched to a second position to define a route from the loading tube 154 to the dispensation nozzle 160. This prepares the extrusion module 150 for activation of the actuator 156 to press or force the macerated solids from the loading tube 154 toward the dispensation nozzle 160. In that second position of the valve 152, the conduit 140 is isolated from the extrusion module 150 to prevent backflow toward the accumulator and macerator module 110 as the macerated solids are extruded from the dispensation nozzle 160. A predetermined amount of macerated solid material is extruded from the tip of the dispensation nozzle 160 with each stroke of the actuator 156, or duty cycle of the extrusion module 150 in other embodiments. Thus extrusion occurs as discrete events delivering consistent material volume with each extrusion event.

In the illustrated example in which the actuator 156 is a linear actuator, each extrusion event of the extrusion module 150 includes a single stroke of the actuator 156, requiring reloading of the loading tube 154 before another extrusion event. Other actuator types are within the scope of these descriptions. For example, rotary, pump, or other actuators in other embodiments can be activated for a metered time to define a discrete extrusion event.

Figure 2:
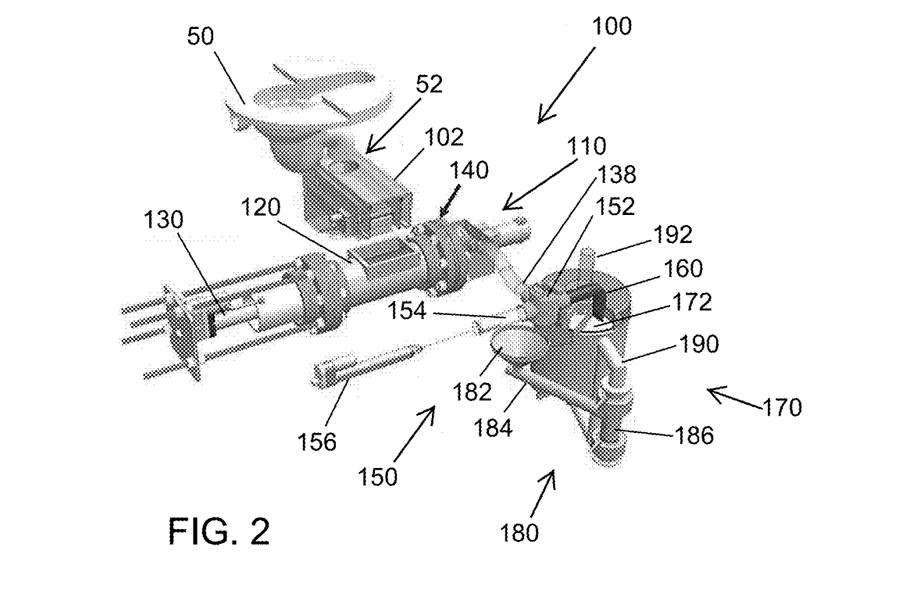
FIG. 2 is a perspective view of the solid waste treatment system of FIG. 1 from another perspective.

The macerated solid material extruded by the dispensation nozzle 160 is delivered to a drying module 170, which includes a rotary drying plate 172 (FIG. 2). Rotation of the drying plate 172 is activated with the activation of the actuator 156 so that the extruded material forms a circularly arcuate or annular bead or ribbon upon the drying plate 172 with the rotation as dispensation from the nozzle 160 occurs. Only a partial rotation of the drying plate 172 is coordinated with each discrete extrusion event so as to prevent overloading and piling onto the drying plate 172 (FIG. 2).

The material macerated solid material extruded onto the drying plate is then dried. Rotation of the drying plate 172 stops at the end of each discrete extrusion event, example for a predetermined amount of time, as the material dries. Rotation of the drying plate 172 occurs again once the material is deemed dry, by assumption according to a predetermined drying time or as determined by sensory measure for each batch, and as the drying plate rotates, the dried material is offloaded from the drying plate 172 by a scraper 174. The dried material is routed by the scraper 174 (FIG. 1) to a combustion module 180. The drying plate 172 can be a circular metal plate with a non-stick coating for example. In the illustrated example the drying module 170 has a drum or barrel housing in which heat is collected from the downstream combustion module 180.

The combustion module 180 includes a collection tray, funnel or bowl 182 that opens at a lower end to a travel conduit 184 (FIGS. 2-3) that leads to a combustor 186. The dried material can be driven along the interior of the travel conduit 184 by a rotating auger 188 (FIG. 3) or other driving apparatus. The combustor 186 burns the dried material producing minimal ash and a hot flue gas. Any ash remaining can be collected, for example at the bottom of the combustor 186, and periodically or occasional removed via a removal hatch or area.

The flue gas is routed by an exhaust conduit 190 away from the combustor 186. In the illustrated embodiment, the exhaust conduit 190 (FIGS. 1-2) routes the flue gas through the drying module 170 where some of the thermal energy of the hot flue gas is transferred to the drying plate 172 or any extruded material on the plate 172. In the illustrated example, the flue gas is distributed within the drying module 170 to dry the extruded material on the plate 172. Additional heating sources may be included, such as a forced air heat gun or other heating elements.

Figure 3:
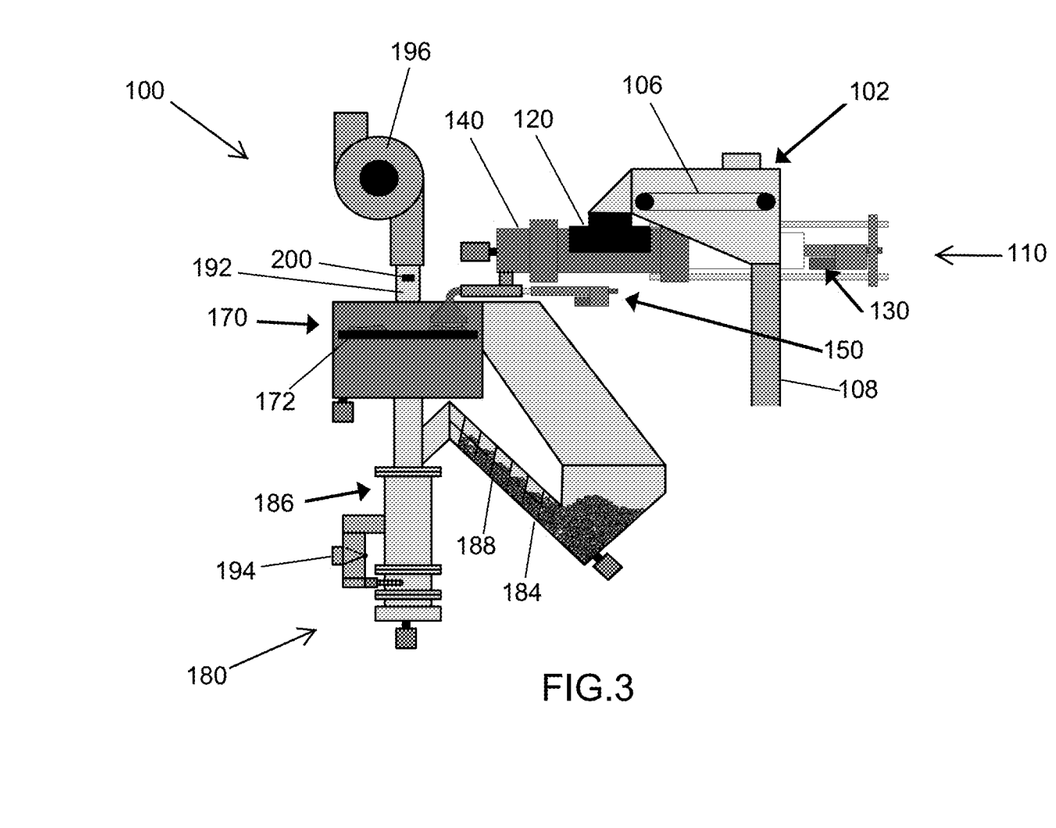
FIG. 3 is diagrammatic representation of the solid waste treatment system of FIG. 1, with additional components as described below.

After heat exchange at the drying module 170, the remaining flue gas exits the illustrated system 100 via an upper exhaust outlet 192 of the drying module 170 for release or for further treatment to address thermal or chemical emissions. In at least one embodiment, combustion is quite efficient, with emission characteristics (NOX, SOX, VOCs, $CO/CO_2$, PM, etc.) well within cookstove standards. In FIG. 3, a blower 196 impels the flue gas from the combustor 186 through the drying module 170.

Combustion within the combustor 186 can be initiated using an external heat source 194 (FIG. 3) and then maintained continuously by the heat of combustion. Combustion can occur in sessions, for example in predetermined or otherwise allotted time slots, or can occur continuously. Although dried material is offloaded from the drying plate 172 by the scraper 174 in discrete batches each corresponding to a period in which the plate 172 rotates, combustion can occur continuously or in any time cycle preferred. The collection tray, funnel or bowl 182 and the travel conduit 184 of the combustion module 180 serve as a hopper that temporarily stores dried material and supplies the dried material continuously to the combustor 186 or in discrete batches that can be uncorrelated with the delivery of dried material from the drying module 170. Thus combustion cycles can be selected to sustain temperatures and durations to meet mass balance requirements. Additional fuels such as plastics, papers and other materials can be added for combustion.

Figure 4:
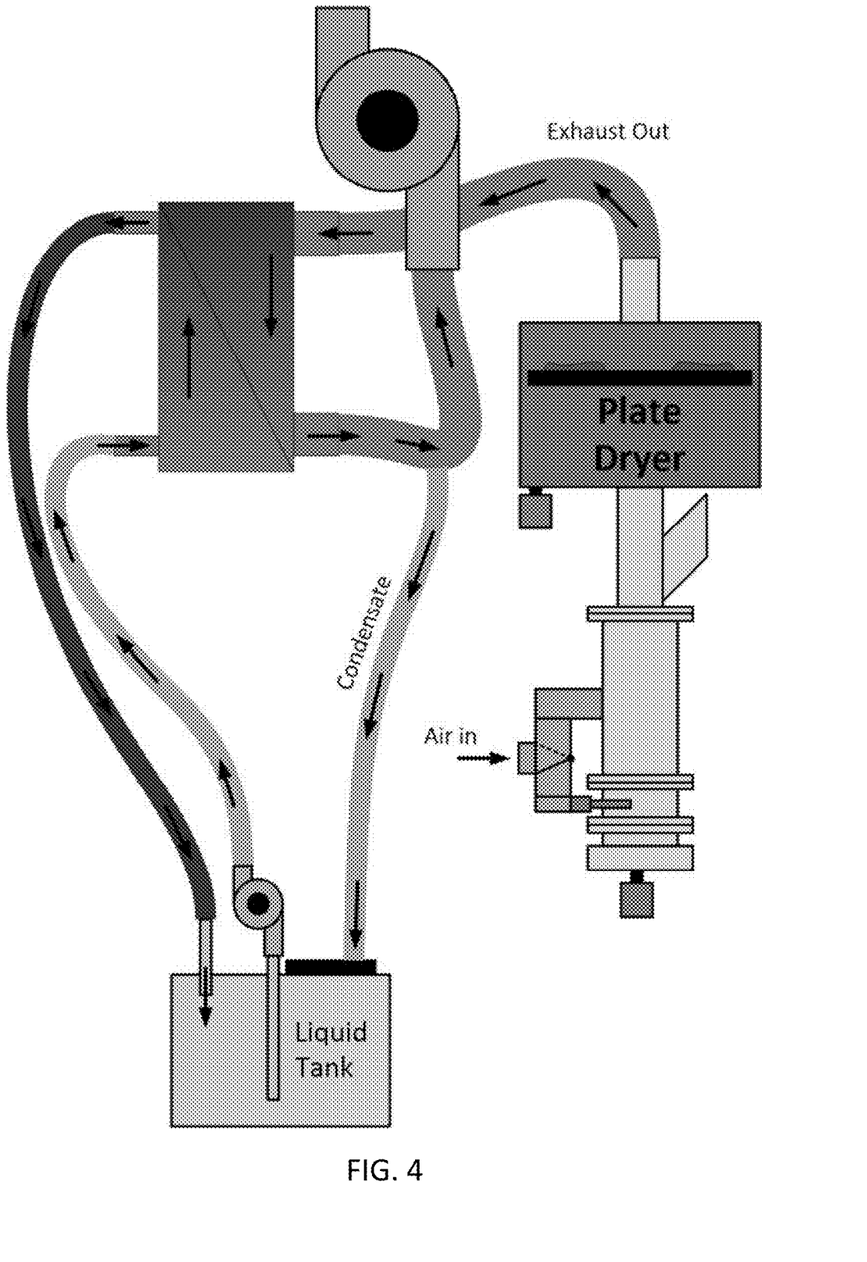
FIG. 4 is a diagrammatic representation of the solid waste treatment system of FIG. 1, with the exhaust waste heat capture components as described below.
Figure 5:
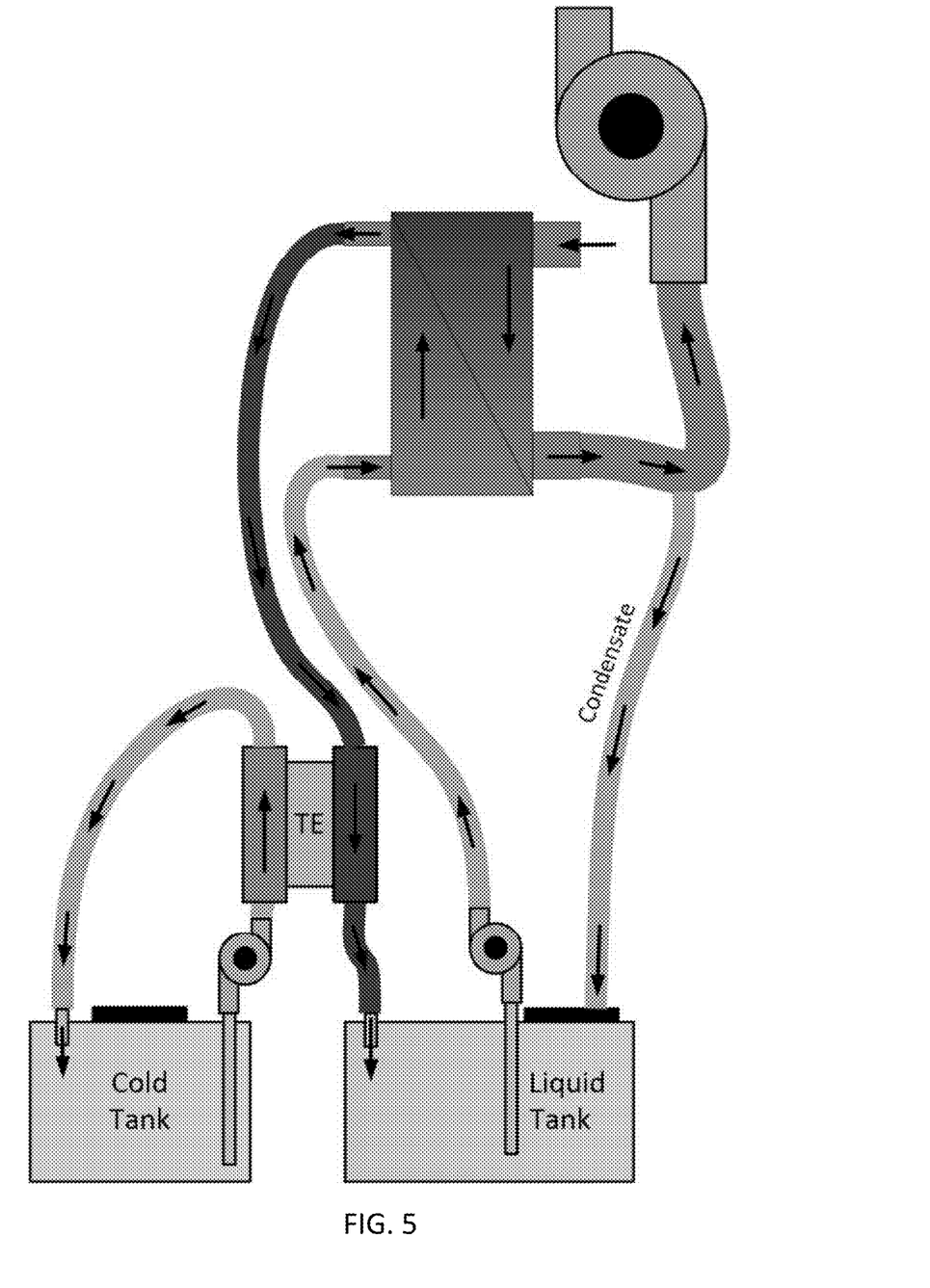
FIG. 5 is a diagrammatic representation of a portion of the solid waste treatment system of FIG. 1, with the exhaust waste heat capture and thermo-electric generator components as described below.

Heat from the combustor 186 can be converted, for example by use of a thermo-electric device, to electrical energy for use and storage. In FIG. 4, the flue gas can be directed through a condensation heat exchanger to capture the sensible and latent heat of condensation. Liquid can pass through the opposite side of the condensation heat exchanger (FIG. 4) to capture the heat from the flue gas and heat the liquid. In FIG. 5, the hot liquid from the condensation heat exchanger can pass through a thermo-electric generator and cold liquid can pass through the opposite side of the thermo-electric generator to convert the heat to electricity. For example, a battery system can be charged for use in powering electrical systems that power and govern the driven components, sensors, and controllers of the solid waste treatment system 100. In at least one example, a thermo-electric power generation device 200 (FIG. 3) is placed in the flue gas flow to receive thermal energy and generate electrical power. Solar power may also be used to generate electricity for direct use and storage. Thus, for example, any external heat sources at the combustor 186 and drying module 170 may be powered without electrical input from an electrical power grid. In at least one embodiment, the solid waste treatment system 100 is energetically autonomous with regard to any electrical power grid, scavenging all power for its operation from wastes under treatment with optionally some additional power input from one or more solar collectors.

The solid waste treatment system 100 can advantageously be quickly deployed and used as a stand-alone system without external sewer system support to reduce the impact of a human presence. Thus, emergency response groups and other entities can use the solid waste treatment system 100 to serve deployed personnel or to serve victims of natural disasters. Many uses are within the scope of these descriptions.

Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims.

What is claimed is:

1. A solid waste treatment system comprising:
   a solid-liquid separator module configured to receive mixed solid and liquid waste and separate solid material from the mixed solid and liquid waste;
   an accumulator and macerator module configured to receive and macerate the solid material from the solid-liquid separator module;
   a drying module configured to receive and dry macerated solid material from the accumulator and macerator module; and
   a combustion module configured to receive and combust dried macerated solid material from the drying module;
   wherein the accumulator and macerator module comprises:
      an accumulator for receiving the solid material from the solid-liquid separator module;
      a macerator; and
      a first actuator configured to force the solid material from the accumulator and into the macerator; and
   wherein the solid waste treatment system further comprises an extrusion module through which the drying module receives the macerated solid material from the accumulator and macerator module.

2. The solid waste treatment system of claim 1, wherein the solid-liquid separator module comprises a conveyor having spaced belts configured to drain liquid from the mixed solid and liquid waste, wherein the conveyor is configured to transport the solid material to the accumulator and macerator module.

3. The solid waste treatment system of claim 1, wherein the first actuator is configured to force the solid material into the macerator, thereby forcing the macerated solid material into the extrusion module.

4. The solid waste treatment system of claim 3, wherein the extrusion module comprises:
   a valve through which the extrusion module receives the macerated solid material from the accumulator and macerator module;
   a loading tube configured to receive the macerated solid material from the accumulator and macerator module through the valve; and
   a second actuator configured to force the macerated solid material through the valve and to the drying module.

5. The solid waste treatment system of claim 4, wherein:
   the valve is configured in a first position when the loading tube is to receive macerated solid material from the accumulator and macerator module through the valve; and
   the valve is configured in a second position when the second actuator is to force macerated solid material through the valve and to the drying module.

6. The solid waste treatment system of claim 1, wherein the drying module comprises a drying plate configured to rotate when the drying module receives the macerated solid material from the extrusion module and to dry the macerated solid material.

7. The solid waste treatment system of claim 6, wherein the drying module comprises a scraper configured to remove the dried macerated solid material from the drying plate.

8. The solid waste treatment system of claim 1, wherein:
   the combustion module comprises: a combustor; and a hopper configured to transport dried macerated solid material from the drying module to the combustor;
   the hopper comprises a travel conduit and a rotating auger within the travel conduit, the rotating auger configured to transport the dried macerated solid material to the combustor; and
   the combustion module produces a flue gas upon combusting the dried macerated solid material and provides the flue gas to the drying module.

9. The solid waste treatment system of claim 8, further comprising a thermo-electric power generation device placed in the flue gas to receive thermal energy and generate electrical power.

10. A method of solid waste treatment comprising:
    receiving, by a solid-liquid separator module, mixed solid and liquid waste;
    separating, by the solid-liquid separator module, solid material from the mixed solid and liquid waste;
    macerating, by an accumulator and macerator module, the solid material;
    drying, by a drying module, the macerated solid material; and
    combusting, by a combustion module, the dried macerated solid material;
    wherein the accumulator and macerator module comprises an accumulator that receives the solid material from the solid-liquid separator module and a first actuator that forces the solid material from the accumulator;
    wherein the method further comprises activating the first actuator thereby forcing the solid material into a macerator of the accumulator and macerator module; and
    wherein forcing the solid material into the macerator of the accumulator and macerator module comprises forcing macerated solid material in an extrusion module.

11. The method of claim 10, further comprising producing, by the combustion module, a hot flue gas and providing the hot flue gas to the drying module.

12. The method of claim 10, further comprising extruding the macerated solid material onto a rotating drying plate of the drying module.

13. The method of claim 10, further comprising extruding, by the extrusion module, the macerated solid material into the drying module.

14. The method of claim 13, wherein the extrusion module comprises:
    a valve;
    a loading tube that receives the macerated solid material from the accumulator and macerator module through the valve; and
    a second actuator that forces the macerated solid material through the valve and into the drying module.

15. The method of claim 14, wherein:
the valve is in a first position when the loading tube receives the macerated solid material from the accumulator and macerator module through the valve; and
the valve is in a second position when the second actuator forces the macerated solid material through the valve and to the drying module.

16. The method of claim 15, further comprising switching the valve from the first position to the second position after the loading tube receives the macerated solid material and before the second actuator forces the macerated solid material through the valve and to the drying module.

17. A method of solid waste treatment comprising:
receiving, by a solid-liquid separator module, mixed solid and liquid waste;
separating, by the solid-liquid separator module, solid material from the mixed solid and liquid waste;
macerating, by an accumulator and macerator module, the solid material;
drying, by a drying module, the macerated solid material;
combusting, by a combustion module, the dried macerated solid material; and
extruding the macerated solid material onto a rotating drying plate of the drying module.

* * * * *